US012537409B2

(12) United States Patent
Ramaswamy et al.

(10) Patent No.: US 12,537,409 B2
(45) Date of Patent: Jan. 27, 2026

(54) STATOR BOBBIN FOR E-MACHINE WITH WINDING RETAINERS AND FLUID FLOW SURFACES

(71) Applicant: Garrett Transportation I Inc., Torrance, CA (US)

(72) Inventors: Srinidhi Payyur Ramaswamy, Bengaluru (IN); Kishor Kumar K, Bengaluru (IN); Matej Kopecky, Brno (CZ); Praveen Kumar, Bengaluru (IN)

(73) Assignee: Garrett Transportation I Inc., Torrance, CA (US)

( * ) Notice: Subject to any disclaimer, the term of this patent is extended or adjusted under 35 U.S.C. 154(b) by 14 days.

(21) Appl. No.: 18/604,739

(22) Filed: Mar. 14, 2024

(65) Prior Publication Data

US 2025/0246962 A1      Jul. 31, 2025

(30) Foreign Application Priority Data

Jan. 29, 2024   (IN) .............................. 202411005832

(51) Int. Cl.
*H02K 3/46* (2006.01)
*F01D 25/12* (2006.01)
(Continued)

(52) U.S. Cl.
CPC .............. *H02K 3/46* (2013.01); *F01D 25/125* (2013.01); *H02K 1/16* (2013.01); *H02K 3/24* (2013.01);
(Continued)

(58) Field of Classification Search
CPC .. H02K 3/24; H02K 3/32; H02K 3/34; H02K 3/345; H02K 3/46; H02K 1/16;
(Continued)

(56) References Cited

U.S. PATENT DOCUMENTS 8,288,903 B2   10/2012  Matsuda et al.
8,816,558 B2    8/2014  Sears et al.
(Continued)

FOREIGN PATENT DOCUMENTS

DE   112018003744 T5   4/2020
EP       2738916 A2    6/2014
(Continued)

*Primary Examiner* — Loren C Edwards
(74) *Attorney, Agent, or Firm* — BelayIP

(57) ABSTRACT

A stator bobbin includes a first winding support with an inner radial portion, an outer radial portion, and a winding space defined radially between the inner radial portion and the outer radial portion with respect to an axis of rotation. The winding space is configured to receive a plurality of windings of the e-machine. The inner radial portion and the outer radial portion extend along the axis between a first end of the stator bobbin and a second end of the stator bobbin. The stator bobbin further includes a winding retainer disposed at the first end and configured for receiving and retaining an end of the plurality of windings. Also, the stator bobbin includes a contoured flow surface disposed proximate the second end. The contoured flow surface defines a nonlinear flow path for a fluid coolant of the e-machine.

18 Claims, 7 Drawing Sheets

(51) Int. Cl.
*H02K 1/16* (2006.01)
*H02K 3/24* (2006.01)
*H02K 3/34* (2006.01)
*H02K 7/14* (2006.01)
*H02K 15/00* (2006.01)

(52) U.S. Cl.
CPC .............. *H02K 3/345* (2013.01); *H02K 7/14* (2013.01); *H02K 15/00* (2013.01); *F05D 2220/40* (2013.01)

(58) Field of Classification Search
CPC ............ H02K 1/20; H02K 7/14; H02K 15/00; H02K 5/20; H02K 5/203; H02K 9/19; F01D 25/12; F01D 25/125; F05D 2220/40; F02B 37/10; F02B 39/005; F02B 39/10
See application file for complete search history.

(56) References Cited

U.S. PATENT DOCUMENTS

| | | | |
|---|---|---|---|
| 2007/0236099 A1* | 10/2007 | Kim | H02K 15/095 310/180 |
| 2014/0056726 A1* | 2/2014 | Garrard | H02K 9/19 417/372 |
| 2014/0184014 A1 | 7/2014 | Kim et al. | |
| 2022/0077750 A1 | 3/2022 | Velderman et al. | |
| 2022/0307503 A1 | 9/2022 | Gutberlet et al. | |

FOREIGN PATENT DOCUMENTS

| | | |
|---|---|---|
| EP | 3163718 B1 | 9/2018 |
| JP | 6654414 B2 | 2/2020 |

\* cited by examiner

STATOR BOBBIN FOR E-MACHINE WITH WINDING RETAINERS AND FLUID FLOW SURFACES

CROSS-REFERENCE TO RELATED APPLICATIONS

The present application claims priority to Indian Provisional Patent Application No. 202411005832, filed Jan. 29, 2024, the entire disclosure of which is incorporated herein by reference.

TECHNICAL FIELD

The technical field generally relates to a stator bobbin and more particularly relates to a stator bobbin for an e-machine with winding retainers and fluid flow surfaces.

BACKGROUND

Turbomachines may be useful for operation of vehicles and other systems. HVAC systems, for example, may include a compressor-type turbomachine that provides temperature-controlled air to a passenger compartment of a vehicle.

Preferably, turbomachines like the compressor of the HVAC system operate at high efficiency in a variety of conditions. Also, these devices are preferably compact and lightweight. Moreover, these turbomachines preferably have a low part count, are relatively easy to make and assemble, and/or provide other manufacturing efficiencies. The turbomachine may include an e-machine, such as an electric motor and/or electric generator. Preferably, the e-machine is preferably a high-efficiency device, the e-machine is compact, it has a low part count, and the e-machine may be manufactured efficiently as well.

However, some existing e-machines configured for turbomachines operate inefficiently in some conditions. The e-machine may suffer from electro-magnetic losses, which negatively affects efficiency. Also, high operating temperatures may have a disadvantageous effect on the e-machine operation. Furthermore, some turbomachines and the e-machine included therein may be bulky, may be difficult to manufacture, assemble, maintain, etc.

Accordingly, there remains a need for a turbomachine that operates at high efficiency and that has a relatively low weight, size, and part count. Furthermore, there remains a need for such a turbomachine that also provides manufacturing efficiencies.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a stator bobbin for a directly-cooled e-machine is disclosed. The stator bobbin includes a plurality of winding supports arranged about an axis. The plurality of winding supports include a first winding support. The first winding support includes an inner radial portion, an outer radial portion, and a winding space defined radially between the inner radial portion and the outer radial portion with respect to the axis. The winding space is configured to receive a plurality of windings of the e-machine. The inner radial portion and the outer radial portion extend along the axis between a first end of the stator bobbin and a second end of the stator bobbin. The stator bobbin further includes a winding retainer disposed at the first end and configured for receiving and retaining an end of the plurality of windings. Also, the stator bobbin includes a contoured flow surface disposed proximate the second end. The contoured flow surface defines a nonlinear flow path for a fluid coolant of the e-machine.

In another embodiment, a turbomachine is disclosed that includes a housing assembly and a rotating group supported for rotation about an axis within the housing assembly. The turbomachine further includes an e-machine that is operable as at least one of an electric motor and an electric generator. The e-machine is housed within the housing assembly and operatively coupled to the rotating group. The housing assembly includes an interior surface that defines an e-machine housing shroud surface. The e-machine is configured to attach within a fluid system that provides a fluid coolant thereto. The turbomachine also includes a stator bobbin member of the e-machine. The stator bobbin includes a plurality of winding supports arranged about the axis. The plurality of winding supports include a first winding support. The first winding support includes an inner radial portion, an outer radial portion, and a winding space defined radially between the inner radial portion and the outer radial portion with respect to the axis. The winding space is configured to receive a plurality of windings of the e-machine. The inner radial portion and the outer radial portion extends along the axis between a first end of the stator bobbin and a second end of the stator bobbin. The stator bobbin further includes a winding retainer disposed at the first end and configured for receiving and retaining an end of the plurality of windings. Also, the stator bobbin includes a contoured flow surface disposed proximate the second end. The contoured flow surface and the shroud surface cooperate to define a nonlinear flow path for the fluid coolant of the fluid system.

In a further embodiment, a method of manufacturing a turbomachine is disclosed that includes providing a housing, providing a rotating group, and providing an e-machine including providing a stator bobbin. The method further includes supporting the rotating group for rotation about an axis within the housing. Additionally, the method includes housing the e-machine within the housing and operably coupling the e-machine to the rotating group to be operable as at least one of an electric motor and an electric generator. The housing assembly includes an interior surface that defines an e-machine housing shroud surface. The stator bobbin member of the e-machine includes a plurality of winding supports arranged about the axis, the plurality of winding supports including a first winding support. The first winding support includes an inner radial portion, an outer radial portion, and a winding space defined radially between the inner radial portion and the outer radial portion with respect to the axis. The winding space is configured to receive a plurality of windings of the e-machine. The inner radial portion and the outer radial portion extends along the axis between a first end of the stator bobbin and a second end of the stator bobbin. The stator bobbin also includes a winding retainer disposed at the first end and that is configured for receiving and retaining an end of the plurality of windings. The stator bobbin also includes a contoured flow surface disposed proximate the second end. The contoured flow surface and the shroud surface cooperate to define a nonlinear flow path for a fluid coolant of the fluid system.

Furthermore, other desirable features and characteristics of the present disclosure will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the present disclosure and not to limit the scope of the present disclosure, which is defined by the claims. Furthermore, there is no intention to be bound by any expressed or implied theory presented in the preceding technical field, background, brief summary, or the following detailed description.

Broadly, example embodiments disclosed herein include a bobbin for an e-machine, such as an e-machine provided for a fluid compressor device or other turbomachine. The bobbin may include an outer radial surface that includes a first end and a second end that are separated along the axis. On and/or proximate the first end, on the outer radial surface, the bobbin may include one or more winding retainers that are configured for receiving, routing, and/or retaining an end segment of windings of the stator of the e-machine. The winding retainers may provide convenience and may make the windings neat and compact. On and/or proximate the second end on the outer radial surface, the bobbin may include one or more contoured flow surfaces. The e-machine may be configured for receiving a flow of coolant, and the contoured flow surfaces may direct fluid coolant across, over, and through the e-machine for direct cooling. Accordingly, the e-machine may be effectively cooled for high efficiency operation. The e-machine and the turbomachine may also be manufactured efficiently.

Figure 1:
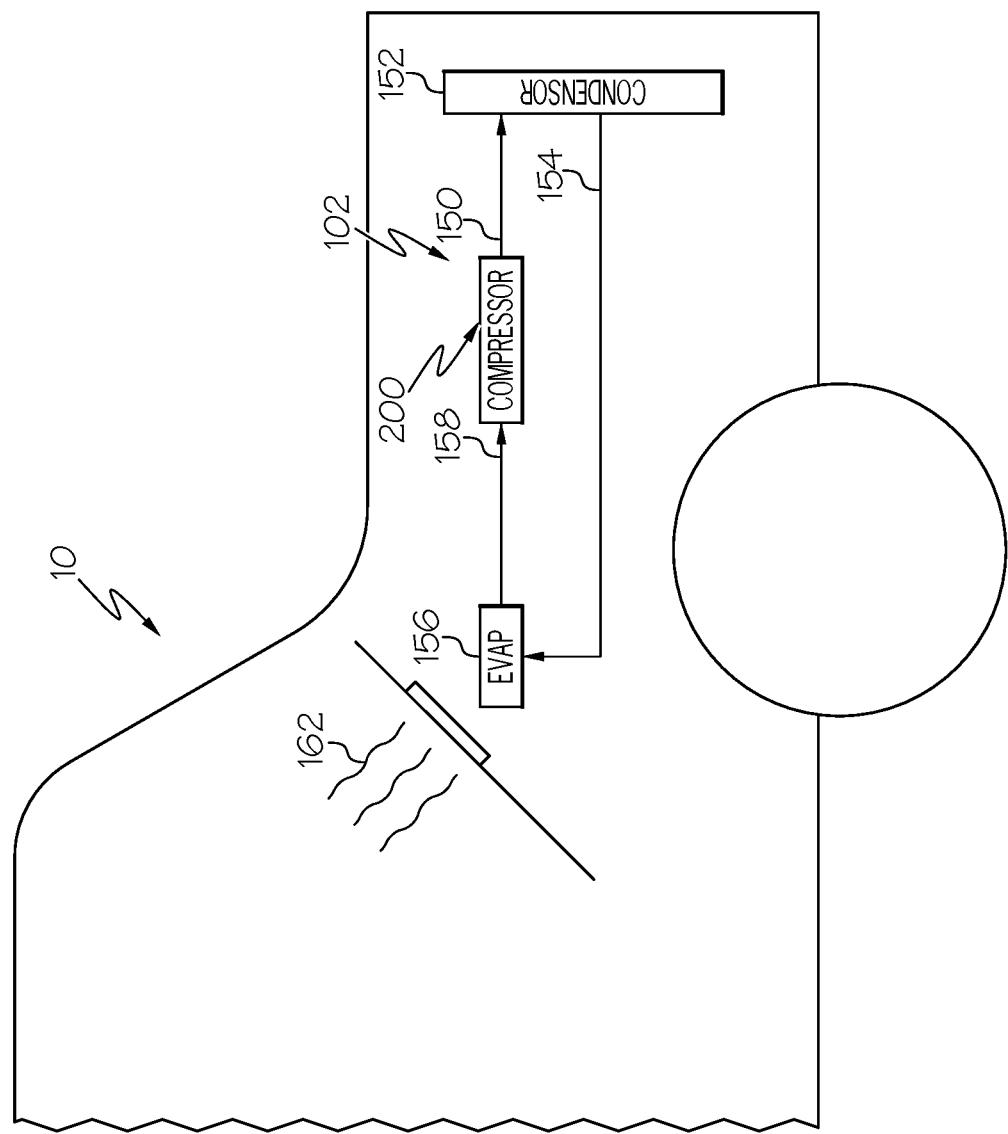
FIG. 1 is a schematic illustration of a fluid system with a compressor device according to example embodiments of the present disclosure.

FIG. 1 is a schematic view of front end of a vehicle 10, such as a passenger car. The vehicle 10 may include a fluid system 102, such as a coolant fluid system, an air conditioning system, refrigerant cycle for an HVAC system, etc.

The fluid system 102 may include a compressor device 200 configured according to example embodiments of the present disclosure. The compressor device 200 may compress a working fluid, such as a fluid refrigerant, and the pressurized fluid stream 150 may flow toward a condenser 152 of the fluid system 102. The condenser 152 may exchange heat with a surrounding fluid, and a resulting fluid stream 154 may flow toward an evaporator 156. The evaporator 156 may also be configured for heat exchange with a surrounding fluid, and the evaporator 156 may provide a resulting input flow 158 back to the compressor device 200.

It will be appreciated that the evaporator 156 and/or condenser 152 may be operatively coupled to one or more fans (not shown) for enhancing heat transfer with the surrounding fluid. It will also be appreciated that the fluid system 102 may include other standard components, such as an expansion valve, drier, etc. for use as the working fluid moves through the thermodynamic cycle within the fluid system 102.

In the embodiment illustrated, the evaporator 156 may be used to provide temperature-controlled air 162 to the cabin of the vehicle 10. In some embodiments, the fluid system 102 may be provided in an electric vehicle, a solar-powered car, a fuel-cell vehicle, or other vehicle 10.

The compressor device 200 may be a turbomachine that includes one or more features of the present disclosure. The compressor device 200 may be configured differently, may be incorporated within a different system, or may otherwise differ from the illustrated embodiments without departing from the scope of the present disclosure. Furthermore, features of the present disclosure may be included on a different turbomachine, such as an electric motor-assisted turbocharger, without departing from the scope of the present disclosure.

Figure 2:
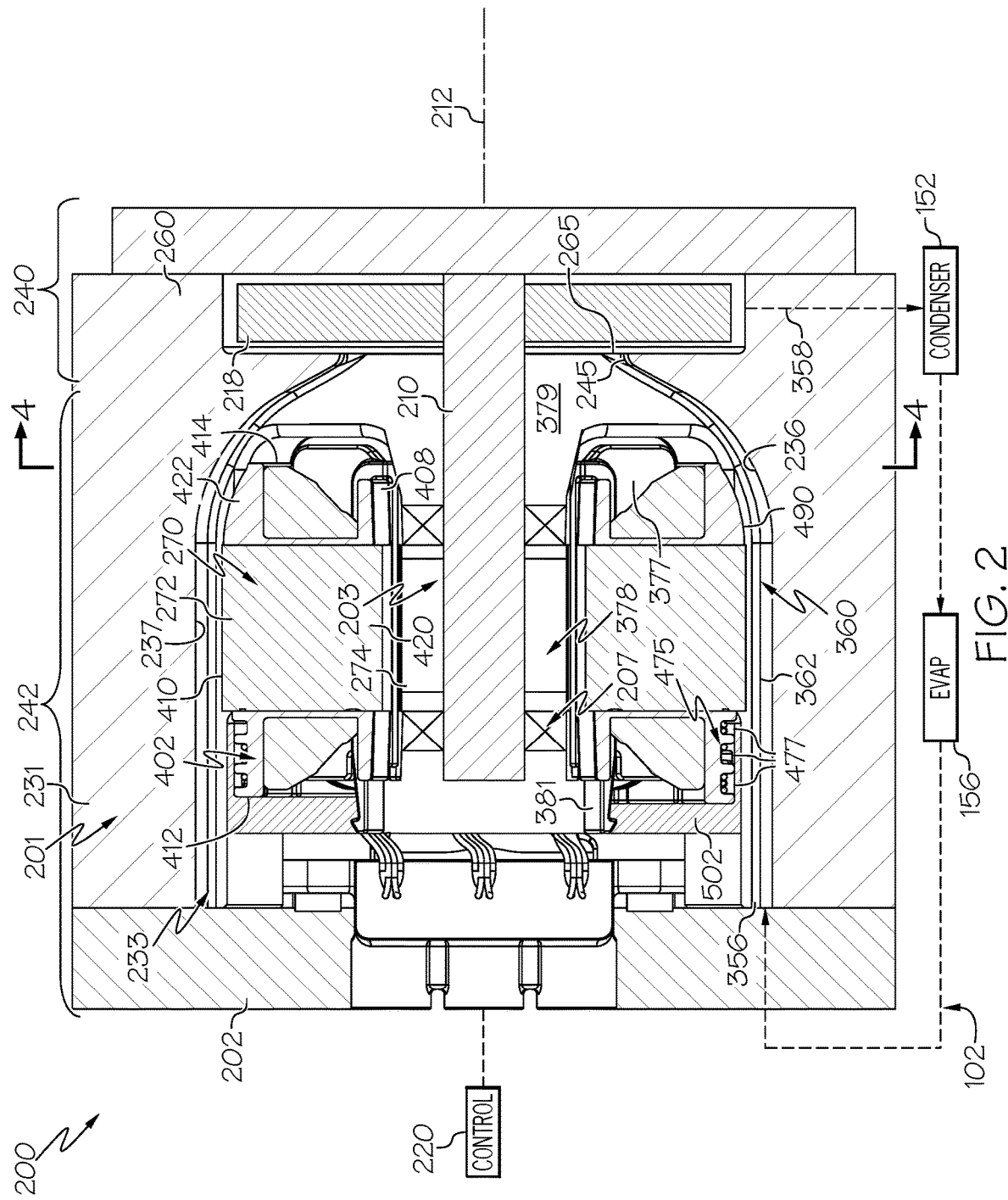
FIG. 2 is a longitudinal cross-sectional view of a turbomachine, such as the compressor device of FIG. 1, configured according to example embodiments of the present disclosure.

The compressor device 200 is illustrated according to example embodiments in FIGS. 2-7. Referring initially to FIG. 2, the compressor device 200 may generally include a housing assembly 201 and a rotating group 203. The rotating group 203 may be supported for rotation within the housing assembly 201 about an axis 212 of rotation by a bearing system 207.

The bearing system 207 may be of any suitable type, such as a fluid bearing (i.e., air bearing, etc.). Accordingly, the bearing system 207 may include one or more journal members that supports the rotating group 203 against radial loading and one or more thrust members that support the rotating group 203 against axial loading, thereby supporting the rotating group 203 for rotation about the axis 212. It will be appreciated, however, that the bearing system 207 may be configured differently to include, for example, a rolling element bearing in additional embodiments of the present disclosure.

The rotating group 203 may include a shaft 210, which is elongate and which extends along the axis 212. The shaft 210 may be substantially centered on the axis 212. In some embodiments, an outer diameter surface of the shaft 210 may be supported by one or more components of the bearing system 207 for rotation relative to the housing assembly 201. The rotating group 203 may also include a wheel 218, such as a compressor wheel 218. The compressor wheel 218 may include a plurality of blades that radiate with respect to the axis 212. The compressor wheel 218 may be fixedly attached and supported on one end of the shaft 210 for rotation therewith.

The housing assembly 201 may include a compressor housing 260 that is shaped and configured according to the compressor wheel 218. As represented in FIG. 2, the compressor housing 260 may surround and house the compressor wheel 218. Together with the wheel 218, the compressor housing 260 may cooperatively define a compressor stage 240 of the compressor device 200 for compressing a working fluid flowing therethrough as will be discussed in detail.

The housing assembly 201 may additionally include an e-machine housing 231. The e-machine housing 231 may be hollow with an interior surface 237 included therein. The interior surface 237 may define a cylindrical e-machine cavity 233 therein. The e-machine housing 231 may be arranged end-to-end along the axis 212 adjacent the compressor housing 260. In some embodiments, at least part of the e-machine housing 231 and at least part of the compressor housing 260 may be defined by a single part such that the e-machine housing 231 and compressor housing 260 are at least partly integrally attached.

Moreover, the compressor device 200 may include an e-machine 270. The e-machine 270 may include a stator member 272 and a rotor member 274. The rotor member 274 may be supported on the shaft 210 and may be surrounded by the stator member 272. The stator member 272 may be fixedly attached and supported within the e-machine cavity 233 of the e-machine housing 231. Thus, the e-machine 270 and the e-machine housing 231 may define an e-machine stage 242 of the compressor device 200.

In some embodiments, the e-machine 270 may be configured to operate as an electric motor, and the e-machine 270 drives the shaft 210 and the compressor wheel 218 in rotation about the axis 212. Thus, fluid that flows through the compressor stage 240 may be compressed to provide the pressurized fluid stream 150 toward the condenser 152 (FIG. 1). In additional embodiments, the e-machine 270 may be configured to operate as a generator such that the e-machine 270 converts rotational energy of the shaft 210 into electric energy. In further embodiments, the e-machine 270 may operate as an electric motor in some conditions and may operate as an electric generator in other conditions.

The e-machine 270, other components of the compressor device 200, and/or features of the fluid system 102 may be controlled by a control system 220. The control system 220 may be a computerized control system and may include a processor, a sensor system, a memory device, and/or additional known components. The control system 220 may be part of a larger vehicle control system that controls additional systems of a vehicle (e.g., engine systems, steering systems, etc.). In some embodiments, the control system 220 may, at least, control the angular velocity of the shaft 210 about the axis 212.

In some embodiments, the compressor device 200 may be "directly cooled" such that a fluid coolant flows through the e-machine cavity 233. The coolant may flow across the e-machine 270, for example, to remove heat from the stator member 272 and/or other portions of the compressor device 200. In some embodiments, the compressor device 200 may be operably connected to the fluid system 102 (FIG. 1), and the working fluid may flow through the e-machine 270 as it circulates through the fluid system 102. In some embodiments, the e-machine stage 242 may be fluidly connected in-series with the compressor stage 240. For example, the compressor stage 240 may be disposed downstream of the e-machine stage 242. One or more fluid passages, pathways, channels, apertures, etc. may define a respective flow path through the compressor stage 240 and further downstream through the compressor stage 240. The working fluid (e.g., in a gaseous state) may flow through the e-machine stage 242 and then flow further downstream through the compressor stage 240.

The housing assembly 201 may include at least one fluid inlet 356 and at least one fluid outlet 358. In some embodiments, the e-machine housing 231 may include at least one fluid inlet 356 extending from outside the e-machine housing 231 and into the cavity 233 therein. The compressor housing 260 may also include at least one fluid outlet 358 configured to outlet fluid away from the compressor wheel 218.

The compressor device 200 may also define at least one flow path 360 (i.e., flow channels, passageways, etc.) through which a fluid may flow from the inlet 356 to the outlet 358. In some embodiments, there may be a plurality of discrete flow paths 360 extending from the inlet 356 to the outlet 358. The flow path 360 may be nonlinear in some embodiments. As will be discussed, the fluid coolant, the working fluid, etc. circulating through the fluid system 102 may also flow through the e-machine housing 231, for example, to cool the e-machine 270.

Figure 3:
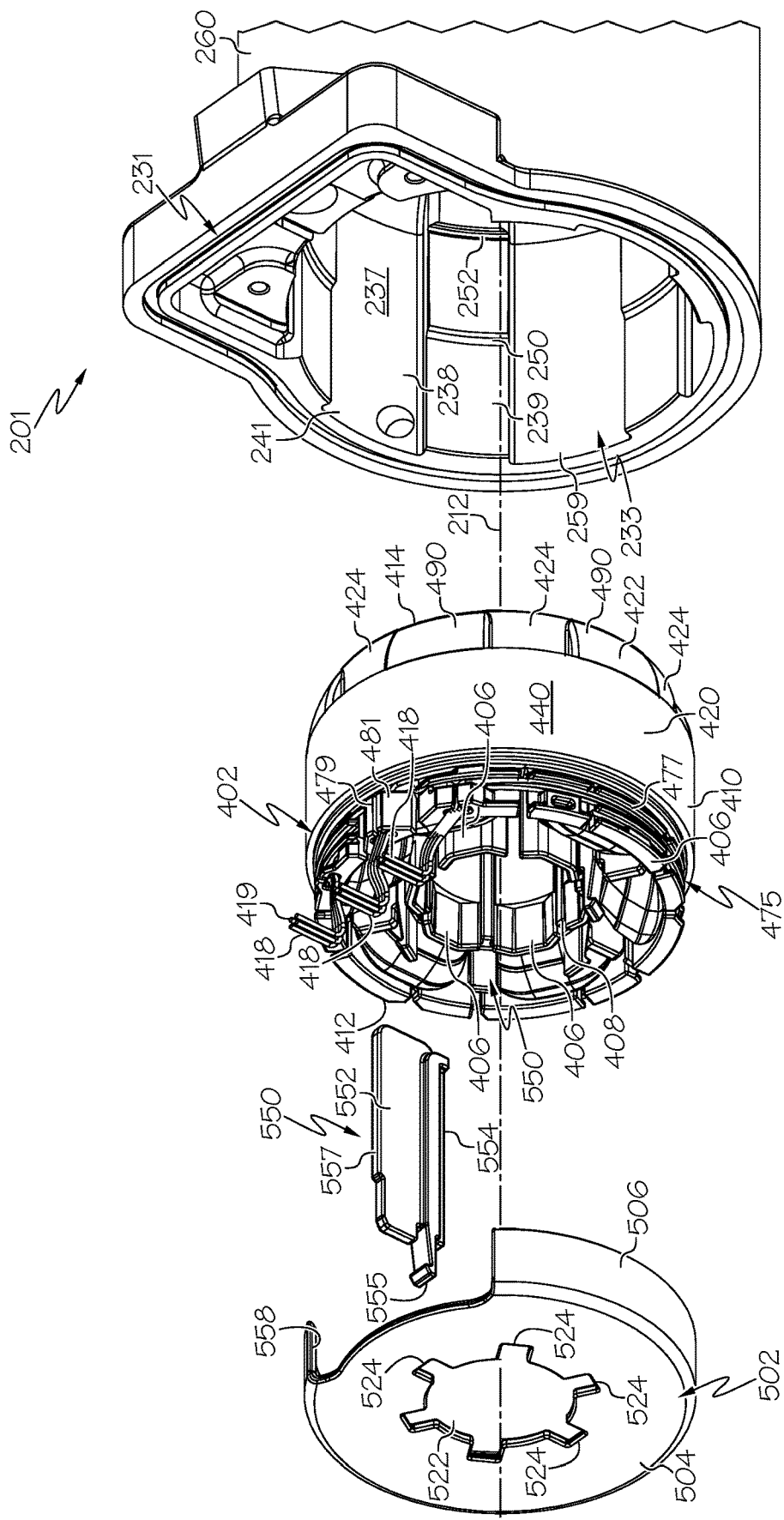
FIG. 3 is an exploded perspective view of the turbomachine of FIG. 2.

Referring now to FIGS. 2 and 3, additional features of the compressor device 200 will be discussed. The e-machine housing 231 is shown in detail in FIG. 3 according to example embodiments. As shown, the e-machine cavity 233 and the interior surface 237 of the e-machine housing 231 may include an open end 241. The open end 241 may be radially wide enough to provide access and passage of the stator member 272 of the e-machine 270 into and out of the e-machine cavity 233. The interior surface 237 of the e-machine housing 231 may further include a constricted second end 245. The second end 245 may gradually taper inward toward the axis 212 as the second end 245 extends toward the compressor housing 260.

The interior surface 237 of the e-machine housing 231 may comprise a base portion 238 and a plurality of longitudinal strips 239. The base portion 238 may define a maximum radial dimension of the interior surface 237. The longitudinal strips 239 may be raised areas of the interior surface 237 that are projected inwardly from the base portion 238 of the interior surface 237. Each strip 239 may extend longitudinally along the axis 212. The strips 239 may be spaced apart at equal angular positions about the axis 212. Accordingly, there may be a plurality of gaps 259 defined between respective neighboring pairs of the strips 239. Stated differently, the gaps 259 may be defined by the base portion 238 of the interior surface 237 between neighboring ones of the strips 239.

In some embodiments, at least one strip 239 may be stepped inwardly as the strip 239 extends further along the axis 212 from end 241 to the second end 245. More specifically, proximate the open end 241, the strip 239 may be projected somewhat inwardly toward the axis 212 from the base portion 238. Further along the axis 212 toward the compressor housing 260, the strip 239 may include a first step 250 and may project further inwardly toward the axis 212. Still further along the axis 212 toward the compressor housing 260, the strip 239 may include a second step 252 and may project still further inwardly toward the axis 212.

The interior surface 237 may be shaped, dimensioned, contoured, etc. according to the exterior of the stator member 272 of the e-machine 270. Thus, the stator member 272 may nest against the interior surface 237 to be supported within the e-machine cavity 233. In some embodiments, the interior surface 237 may include features that define flow channels for the fluid system 102 as will be discussed.

Figure 6:
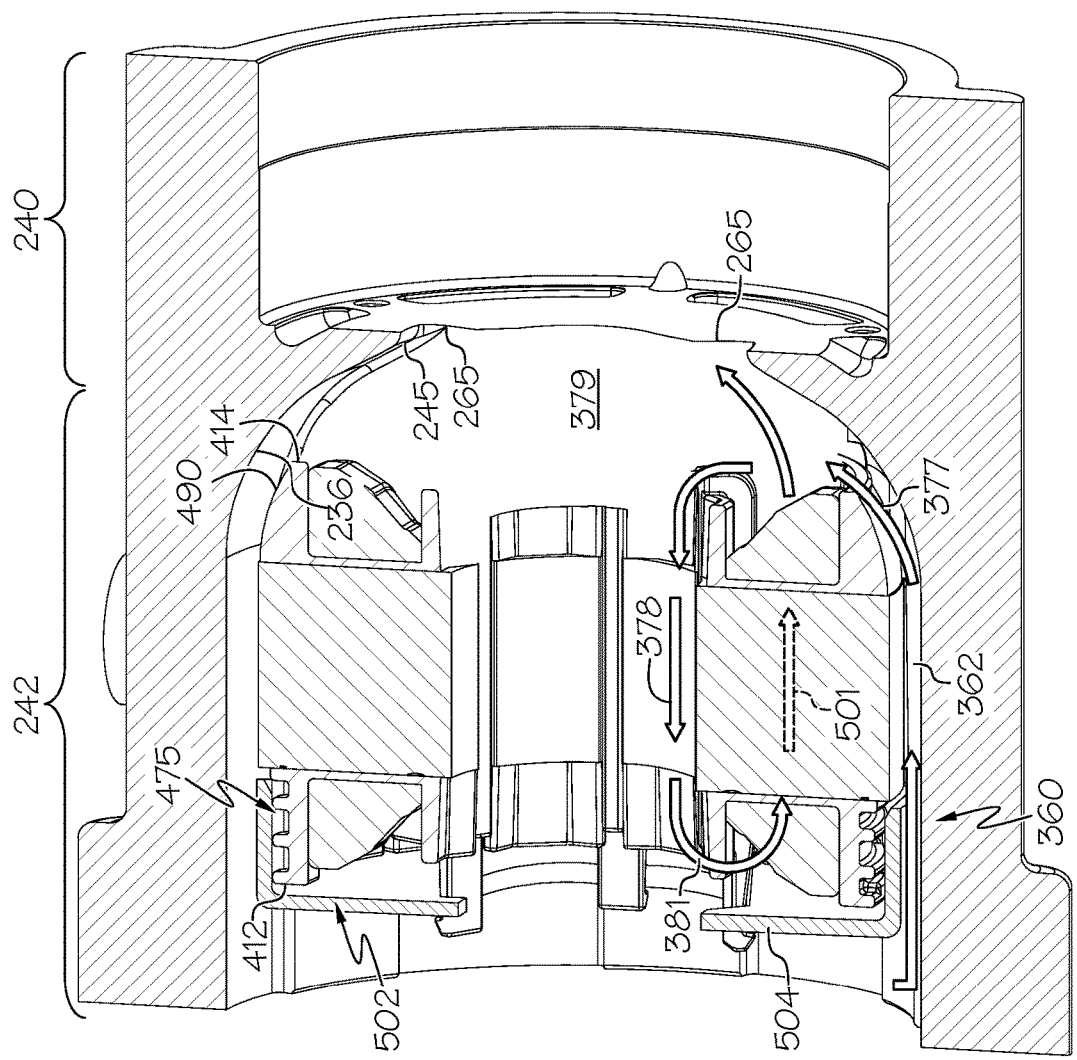
FIG. 6 is a longitudinal cross-sectional perspective view of the turbomachine taken along the line 6-6 of FIG. 4.
Figure 7:
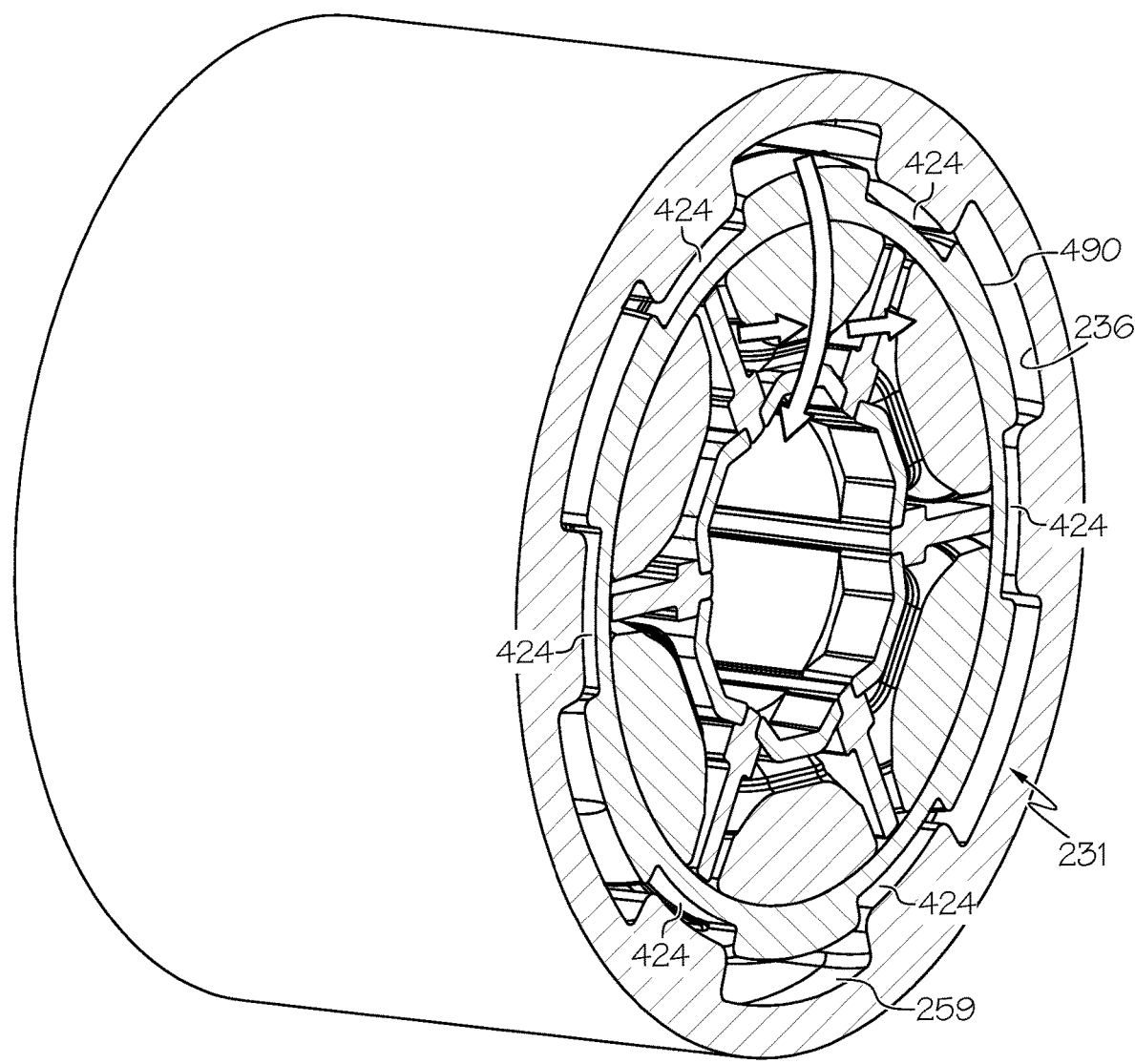
FIG. 7 is a perspective view of the turbomachine of FIG. 2 with an axial cross-sectional view included.

Furthermore, proximate the second end 245, the e-machine housing 231 may include at least one passthrough aperture 265 (FIGS. 2 and 6). There may be a plurality of passthrough apertures 265 arranged angularly about the axis 212. The passthrough apertures 265 may be holes, openings, or other apertures that extend between and that fluidly connect the e-machine cavity 233 and the compressor housing 260.

Figure 4:
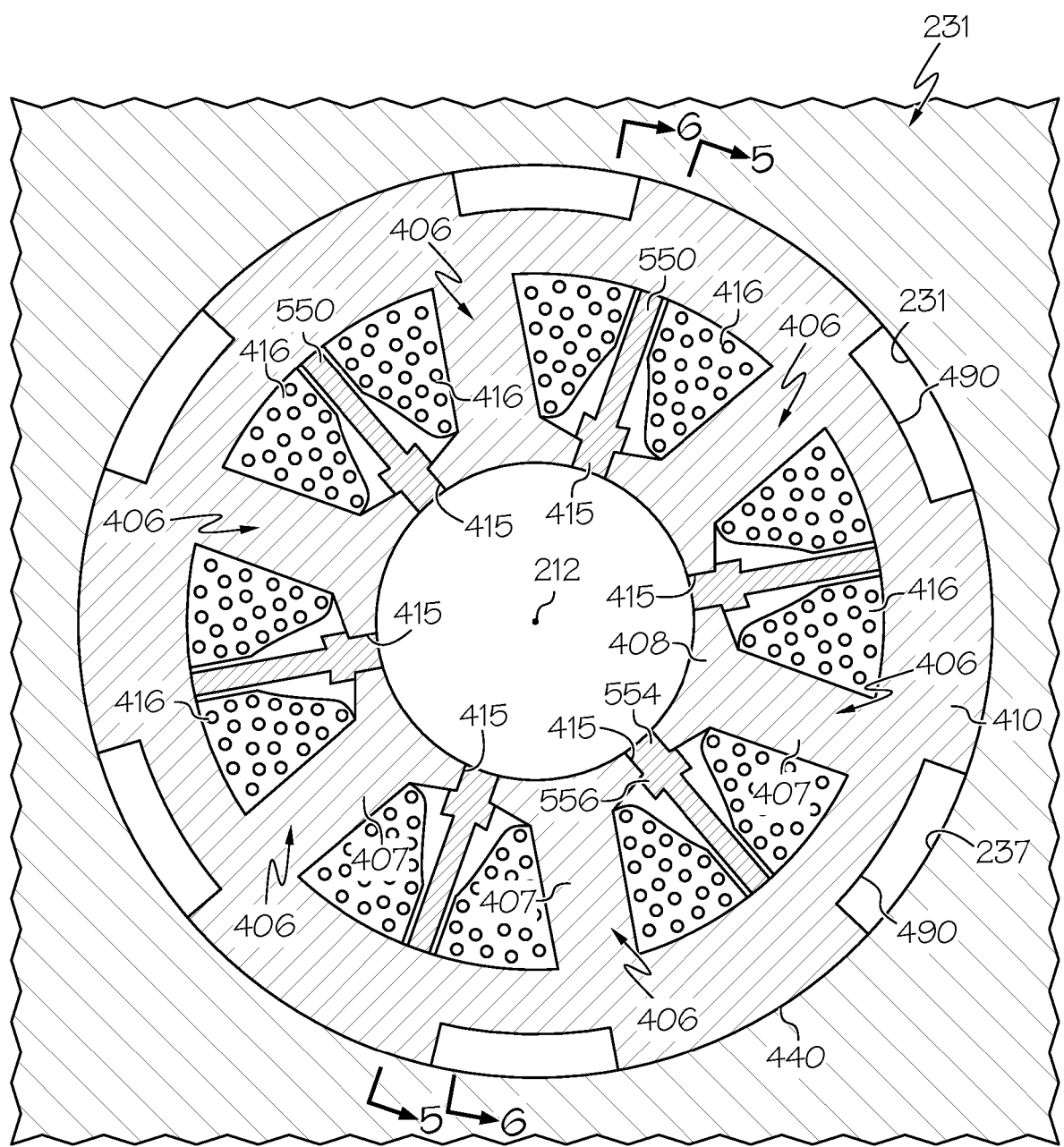
FIG. 4 is an axial cross-sectional view of the turbomachine taken along the line 4-4 of FIG. 2.

As shown in FIG. 3, the e-machine 270 may include a stator bobbin 402 of the stator member 272. The stator bobbin 402 may be spool-shaped, cylindrical and hollow so as to accommodate the rotor member 274 (FIG. 2). Accordingly, the stator bobbin 402 may include an inner radial portion 408, an outer radial portion 410, a first end 412, and a second end 414. The stator bobbin 402 may include a plurality of winding supports 406 (i.e., teeth) that are arranged in an annular arrangement about the axis 212. As shown in FIG. 4, there may be six (6) winding supports 406; however, it will be appreciated that the number of winding supports 406 may differ without departing from the scope of the present disclosure. The winding supports 406 may be joined at the outer radial portion 410 as shown in FIG. 4. Also, the stator bobbin 402 may include slots 415 between neighboring ones of the winding supports 406 on the inner radial portion 408. The slots 415 may extend along the inner radial portion 408 and along the axis 212. As shown in the cross-sectional view of FIG. 4, the winding supports 406 may also have an intermediate portion 407 included radially between the inner radial portion 408 and the outer radial portion 410. The intermediate portion 407 may have a narrower width (measured in the circumferential direction about the axis 212) than at the inner radial portion 408. Accordingly, the outer radial portion 410 may be substantially annular, and the intermediate portion 407 of the winding supports 406 may project inwardly radially toward the axis 212. At the inner radial portion 410, the winding supports 406 may be wider such that the cross-sectional profile is substantially T-shaped (FIG. 4).

The stator member 272 may further include a plurality of windings 416. The windings 416 may include a plurality of wires, etc. that are wound about the winding supports 406. The windings 416 may be wound about the intermediate portions 407 of the winding supports 406. The slots 415 may provide passage for the wires as the windings 416 are wound on the winding supports 406 during manufacture. Also, the windings 416 may include respective ends 418 (FIGS. 2 and 3) that extend away from the winding supports 406. In some embodiments, the ends 418 may be disposed at the first end 412 of the stator bobbin 402 and may extend away therefrom.

Furthermore, as shown in FIG. 2, the bobbin 402 may include, comprise, and/or may be defined by a metallic inner member 420 (i.e., a first member) and a non-metallic outer member 422 (i.e., a second member, covering member, etc.). In some embodiments, the outer member 422 may be constructed from a polymeric material or other material that is more electrically insulative than the inner member 420. Furthermore, the inner member 420 may comprise a plurality of thin laminations that are stacked along the axis 212. Additionally, in some embodiments, the outer member 422 may be over-molded onto the inner member 420 in an insert-molding process during manufacture. In other embodiments, the bobbin 402 may be additively manufactured, for example, in a 3-D printing process. The inner member 420 may be somewhat annular, hollow, and cylindrical in shape and centered about the axis 212. The inner member 420 may be axially disposed between the first end 412 and the second end 414 of the stator member 272. The outer member 422 may also be somewhat annular, hollow, and cylindrical in shape and centered about the axis 212. The outer member 422 may extend axially away from the inner member 420 to define the first end 412 of the stator bobbin 402. Also, the outer member 422 may extend axially away from the inner member 420 to define the second end 414 of the stator bobbin 402. The inner member 420 and the outer member 422 may cooperatively define the inner radial portion 408 and the outer radial portion 410. Portions of the outer member 422 may also pass through holes and/or other apertures of the inner member 420 to thereby attach the inner and outer members 420, 422 of the stator bobbin 402. Thus, the outer member 422 and the inner member 420 may cooperatively define the stator bobbin 402, including the plurality of winding supports 406. The outer member 422 and the inner member 420 may cooperatively define an outer diameter surface 440 of the stator bobbin 402, which faces outward radially from the axis 212.

Figure 5:
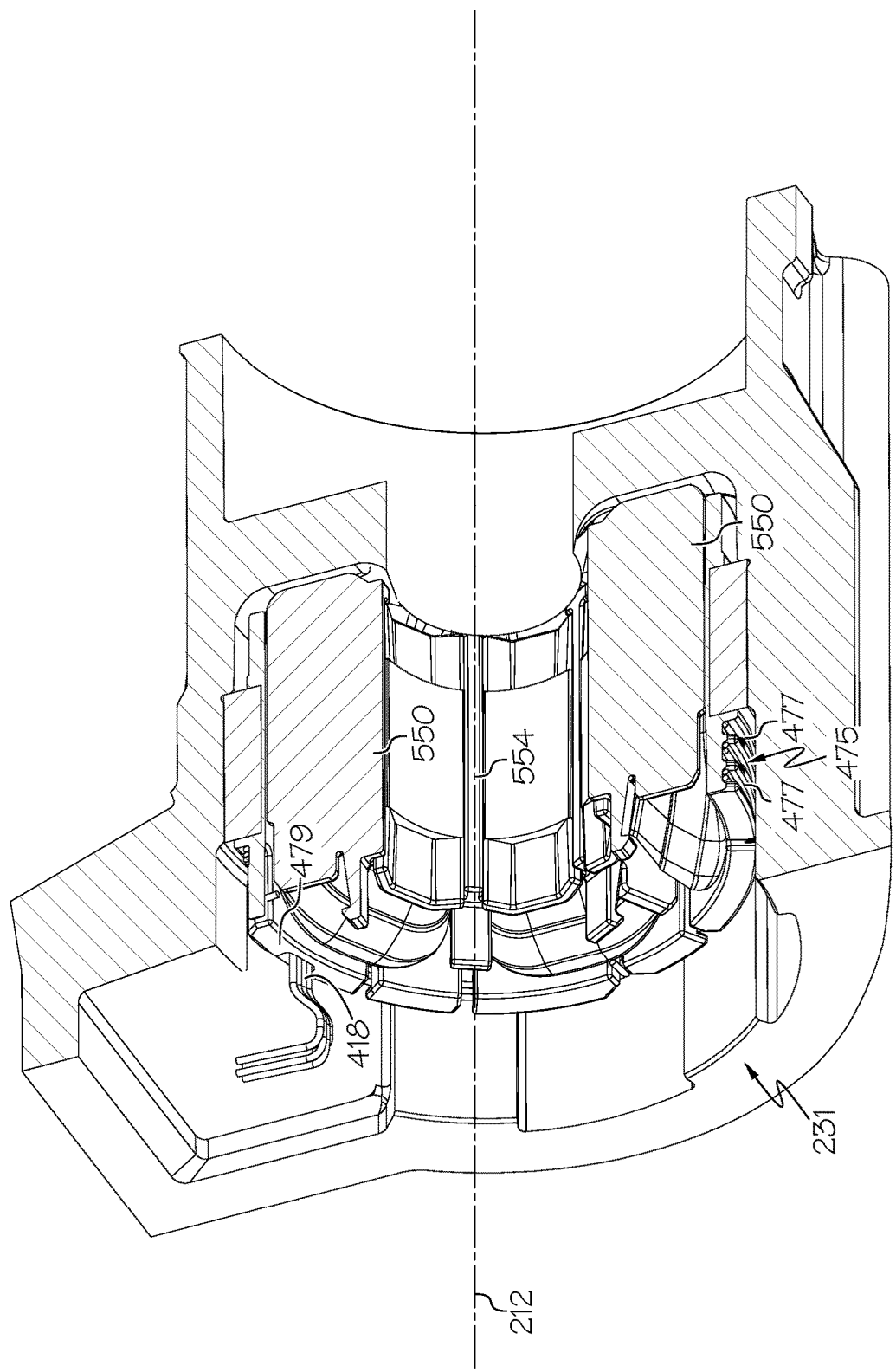
FIG. 5 is a longitudinal cross-sectional perspective view of the turbomachine taken along the line 5-5 of FIG. 4.

In some embodiments, the stator bobbin 402 may include at least one winding retainer 475 (FIGS. 3, 5, and 6). In some embodiments, the winding retainer 475 may include at least one circumferential routing portion, such as a groove 477, that extends circumferentially about the axis 212 on the outer diameter surface 440 of the stator bobbin 402. The outer member 422 may define three grooves 477 at the first end 412 of the stator bobbin 402 as shown in the illustrated embodiments. The grooves 477 may receive respective ones of the wire ends 418 of the windings 416. Thus, the ends 418 may be routed and retained securely and conveniently within the grooves 477. Furthermore, the winding retainer 475 may also include at least one terminal clasp 479 (FIGS. 3 and 5). There may be three clasps 479 as shown, and the clasps 479 may project axially from the first end 412 of the stator bobbin 402. The clasps 479 may include a respective opening 481 on the outer diameter surface 440, and the opening 481 may receive a respective terminal end 419 of the wire ends 418. Thus, the clasp 479 may securely and conveniently retain and direct the terminal end 419 away from the first end 412 of the stator bobbin 402 for attachment to the control system 220 (FIG. 2).

The stator member 272 may further include an end fluid deflector member 502. The end fluid deflector member 502 may be a thin plate with a substantially constant thickness. The end fluid deflector member 502 may include a cover plate 504, which extends normal to the axis 212, and a side lip 506 that extends annularly about the periphery of the cover plate 504. The lip 506 may be sized to fit over the first end 412 of the stator bobbin 402 and over the winding retainer 475 on the first end 412. In this position, the cover plate 504 may extend over and cover the first end 412 of the stator bobbin 402. The cover plate 504 may also include a center opening 522 for the shaft 210. The center opening 522 may also include a plurality of notches 524 that are spaced apart angularly about the axis 212. Also, the lip 506 may be interrupted in the circumferential direction by a rim opening 558. The rim opening 558 may receive the winding retainers 475 of the stator bobbin 402 when the end fluid deflector member 502 is attached to the first end 412 of the stator bobbin 402.

Moreover, the stator member 272 may include one or more isolator barrier members 550 (FIGS. 3, 4, and 5). In some embodiments, there may be a plurality of barrier members 550 (e.g., one for each of the slots 415). As shown in FIGS. 3 and 5, the barrier member 550 may include a thin, flat plate 552 that is substantially rectangular. The barrier member 550 may also include an inner radial edge 554. As shown in FIG. 4, the inner radial edge 554 may be removably received in a respective one of the slots 415 to attach and engage to the stator bobbin 402. The barrier member 550 may include a ridge 556 providing the barrier member 550 with a cruciform cross-sectional profile that engages bobbin 402 and substantially fills the slot 415 between the neighboring winding supports 406. As shown in FIG. 3, the barrier member 550 may further include a hooked axial end 555. The hooked axial end 555 may be removably received in a respective one of the notches 524 to attach and engage to the end fluid deflector member 502 and/or to the bobbin 402. Accordingly, in this position, the barrier members 550 may extend radially between the inner radial portion 408 and the outer radial portion 410 of the stator bobbin 402 (FIG. 4). In some embodiments, an outer radial edge 557 of the barrier member 550 may nest and/or abut against the outer radial portion 410 of the stator bobbin 402.

As shown in FIGS. 2 and 3, the stator bobbin 402 may include one or more contoured flow surfaces 490. The contoured flow surfaces 490 may be included at the second end 414 on the outer diameter surface 440. The flow surfaces 490 may be contoured gradually and may be convex so as to contour inwardly toward the axis 212. In other words, at least one of the contoured flow surfaces 490 may be three-dimensionally contoured. Thus, the flow surface 490 may curve about the axis 212 (FIG. 4), and the flow surface 490 may curve convexly within a radial plane that is defined partly by the axis 212 and that is normal to the axis 212 (FIG. 2). Thus, the outer diameter surface 440 of the stator bobbin 402 may have a substantially constant radius from the first end 412 of the stator bobbin 402 and axially toward the second end 414, and along the flow surface 490, the radius of the outer diameter surface 440 may gradually reduce and taper down in size. As shown in FIG. 3, there may be a plurality of similar flow surfaces 490 that are spaced apart equally about the axis 212 on the second end 414. Furthermore, the stator bobbin 402 may include pockets 424 that are disposed angularly between the flow surfaces 490.

The stator member 272 may be received in the e-machine cavity 233, and the outer diameter surface 440 of the bobbin 402 may be nested, and abuttingly supported against the interior surface 237. As shown, the second end 414 of the bobbin 402 may be disposed adjacent the constricted second end 245 of the interior surface 237. Also, the pockets 424 may receive corresponding ones of the strips 239 of the interior surface 237 to limit the bobbin 402 against rotation relative to the housing assembly 201 (i.e., to support against relative rotation).

The shaft 210 and the other components of the rotating group 203 may also be provided using known manufacturing techniques. Also, an end plate 202 (FIG. 2) may be provided for further housing the e-machine 270. Before encapsulating the e-machine 270 and the rotating group 203 within the housing assembly 201, the terminal ends 418 may be electrically connected within respective circuits to thereby electrically and operatively connect the e-machine 270 to the control system 220 (FIGS. 2 and 5).

Referring now to FIGS. 2 and 4-7, the flow path(s) 360 through the compressor device 200 will be discussed according to example embodiments. There may be a plurality of flow path 360 that diverge and/or converge for the fluid flowing through the fluid system 102. The flow path(s) 360 may define a downstream direction, and embodiments will be discussed starting at the inlet 356 and moving in the downstream direction toward the outlet 358. In some embodiments, the downstream direction may be defined generally from the first end 412 and axially toward the second end 414. Various features of the stator member 272 may direct the flow path through the compressor device 200 for efficient cooling.

As shown in FIGS. 2 and 6, the flow path 360 may include a first outer segment 362 that is fluidly connected to the inlet 356. The first outer segment 362 may be cooperatively defined by the outer diameter surface 440 of the bobbin 402 and the base portion 238 of the interior surface 237. In other words, the first outer segment 362 may be a gap defined radially between the base portion 238 of the interior surface 237 and the outer diameter surface 440. Further downstream, the bobbin flow surfaces 490 may cooperate with opposing shroud surfaces 236 defined by the interior surface 237 to define a radial segment 377 of the flow path 360. Like the flow surfaces 490, the shroud surfaces may be three-dimensionally contoured to direct the flow path 360 radially inward as the fluid flows in the downstream direction.

The radial segment 377 may be fluidly connected downstream to a radial chamber 379 that is cooperatively defined axially between the axial end of the e-machine 270 and the constricted second end 245 of the interior surface 237. The radial chamber 379 may extend at least partly in the radial direction over the axial end of the e-machine 270. The passthrough apertures 265 (FIG. 6) may extend through the housing assembly 201 to fluidly connect the chamber 379 and the compressor stage 240. Accordingly, as shown in FIG. 6, some of the fluid in the radial chamber 379 may move axially through the passthrough apertures 265 into the compressor stage 240.

Another portion of the fluid flow in the radial chamber 379 may turn back axially and flow along a second inner segment 378 of the flow path 360. As represented in FIG. 2, the second inner segment 378 may be defined in the gap between the bobbin 402 and the rotating group 203. In some embodiments in which the bearing system 207 comprises an air bearing system, the second inner segment 378 of the flow path 360 may be routed through one or more portions of the bearing system 207 (FIG. 2). Accordingly, the flow path 360 may provide the working fluid to one or more journal members of the bearing system 207 to support against radial loading on the rotating group 203 and/or to a thrust member of the bearing system 207 to support against thrust loading on the rotating group 203. Generally though, the second inner segment 378 may define a downstream flow direction that extends axially, opposite the downstream direction of the first outer segment 362.

The second inner segment 378 may extend toward the end fluid deflector member 502, and the cover plate 504 may deflect the flow path 560 and define a second radial segment 381, wherein the flow path 560 turns radially outward. Further downstream, the flow path 560 may extend about the windings 416; however, downstream flow within the bobbin 402 and about the windings 416 may be generally along the axial direction from the first end 412 toward the second end 414 as represented by arrow 501 in FIG. 6. This flow may re-join flow along the radial segment 377. Flow may exhaust from the e-machine housing 231, through the passthrough aperture 265, and into the compressor housing 260.

It will be appreciated that the working fluid may flow along the flow path 360 to directly cool the stator windings 416, the bobbin 402 and/or other portions of the e-machine 270 before the fluid passes to the compressor stage 240. The cooling may occur largely by convective heat transfer. This may be very effective cooling across a wide range of operating conditions, which may benefit operating efficiency of the e-machine 270. Also, the fluid may be routed through the bearing system 207 (e.g., an air bearing) to support rotation of the rotating group 203 relative to the housing assembly 201. The compressor device 200 may also be relatively compact, lightweight, and the part count may be relatively low. Additionally, the compressor device 200 may be manufactured, assembled, etc. efficiently.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A stator bobbin for a directly-cooled e-machine comprising:
   a plurality of winding supports arranged about an axis, the plurality of winding supports including a first winding support, the first winding support including an inner radial portion, an outer radial portion, and a winding space defined radially between the inner radial portion and the outer radial portion with respect to the axis, the winding space configured to receive a plurality of windings of the e-machine, the inner radial portion and the outer radial portion extending along the axis between a first end of the stator bobbin and a second end of the stator bobbin; and
   the outer radial portion including an outer radial surface facing substantially away from the axis, the outer radial surface gradually tapering down in radius as the outer radial surface extends from the first end toward the second end to define a contoured flow surface disposed proximate the second end, the contoured flow surface defining a nonlinear flow path for a fluid coolant of the e-machine.

2. The stator bobbin of claim 1, wherein the contoured flow surface is three-dimensionally contoured to curve about the axis and to also curve convexly within a plane, the axis lying within the plane, and the plane being normal to the axis.

3. The stator bobbin of claim 1, wherein the contoured flow surface contours in a downstream direction radially inward toward the axis as the outer radial surface extends away from the first end and toward the second end.

4. The stator bobbin of claim 1, wherein the contoured flow surface is one of a plurality of contoured flow surfaces that are disposed proximate the second end and that are spaced apart about the axis; and
   further comprising a pocket on the outer radial surface that is disposed angularly between the plurality of contoured flow surfaces.

5. The stator bobbin of claim 1, further comprising a first member and a second member, the first member being metallic and the second member being more electrically insulative than the first member, the first member and the second member cooperatively defining the stator bobbin.

6. The stator bobbin of claim 1, wherein the winding retainer includes a circumferential routing portion extending about the axis and configured to receive the end of the plurality of windings.

7. The stator bobbin of claim 1, wherein the winding retainer includes a terminal clasp configured to receive and retain a terminal end of the plurality of windings.

8. A turbomachine comprising:
   a housing assembly;
   a rotating group supported for rotation about an axis within the housing assembly;
   an e-machine that is operable as at least one of an electric motor and an electric generator, the e-machine housed within the housing assembly and operatively coupled to the rotating group, the housing assembly including an interior surface that defines an e-machine housing shroud surface, the interior surface including a raised area that is projected inward toward the axis, the e-machine configured to attach within a fluid system that provides a fluid coolant thereto;
   a stator bobbin member of the e-machine that includes:
      a plurality of winding supports arranged about the axis, the plurality of winding supports including a first winding support, the first winding support including an inner radial portion, an outer radial portion, and a winding space defined radially between the inner radial portion and the outer radial portion with respect to the axis, the winding space configured to receive a plurality of windings of the e-machine, the inner radial portion and the outer radial portion extending along the axis between a first end of the stator bobbin member and a second end of the stator bobbin member;
      a winding retainer disposed at the first end and configured for receiving and retaining an end of the plurality of windings;
      a plurality of contoured flow surfaces disposed proximate the second end and spaced apart about the axis, at least one of the plurality of contoured flow surfaces and the shroud surface cooperating to define a nonlinear flow path for the fluid coolant of the fluid system; and
      a pocket on the outer radial surface that is disposed angularly between the plurality of contoured flow surfaces, the pocket receiving the raised area of the interior surface.

9. The turbomachine of claim 8, wherein the at least one of the plurality of contoured flow surfaces is three-dimensionally contoured to curve about the axis and to also curve convexly within a plane, the axis lying within the plane, and the plane being normal to the axis.

10. The turbomachine of claim 8, wherein the at least one of the plurality of contoured flow surfaces and the shroud surface contour to define a downstream direction away from the first end and toward the second end, the at least one of the plurality of contoured flow surfaces and the shroud surface contouring in the downstream direction to curve radially inward toward the axis.

11. The turbomachine of claim 10, further comprising a radial chamber cooperatively defined between an axial end of the e-machine and the interior surface;
   wherein the flow path is fluidly connected downstream to the radial chamber; and
   further comprising an inner segment of the flow path that is cooperatively defined by the stator bobbin member and the rotating group, the radial chamber being fluidly connected downstream to the inner segment.

12. The turbomachine of claim 11, further comprising a bearing system, and wherein the inner segment of the flow path is routed through the bearing system for the fluid coolant to support rotation of the rotating group relative to the housing assembly.

13. The turbomachine of claim 11, further comprising a compressor stage; and wherein the housing assembly includes a passthrough aperture that fluidly connects the radial chamber to the compressor stage.

14. The turbomachine of claim 8, wherein the stator bobbin includes a first member and a second member, the first member being metallic and the second member being more electrically insulative than the first member, the first member and the second member cooperatively defining the stator bobbin.

15. The turbomachine of claim 8, wherein the winding retainer includes a circumferential routing portion extending about the axis and configured to receive the end of the plurality of windings.

16. The turbomachine of claim 8, wherein the winding retainer includes a terminal clasp configured to receive and retain a terminal end of the plurality of windings.

17. A method of manufacturing a turbomachine comprising
providing a housing;
providing a rotating group;
providing a stator bobbin of an e-machine;
supporting the rotating group for rotation about an axis within the housing;
housing the e-machine within the housing and operably coupling the e-machine to the rotating group to be operable as at least one of an electric motor and an electric generator, the housing including an interior surface that defines an e-machine housing shroud surface, the interior surface including a raised area that is projected inward toward the axis;
the stator bobbin of the e-machine including:
a plurality of winding supports arranged about the axis, the plurality of winding supports including a first winding support, the first winding support including an inner radial portion, an outer radial portion, and a winding space defined radially between the inner radial portion and the outer radial portion with respect to the axis, the winding space configured to receive a plurality of windings of the e-machine, the inner radial portion and the outer radial portion extending along the axis between a first end of the stator bobbin and a second end of the stator bobbin;
a winding retainer disposed at the first end and configured for receiving and retaining an end of the plurality of windings;
a plurality of contoured flow surfaces disposed proximate the second end and spaced apart about the axis, at least one of the contoured flow surfaces and the shroud surface cooperating to define a nonlinear flow path for a fluid coolant of the e-machine;
a pocket on the outer radial surface that is disposed angularly between the plurality of contoured flow surfaces; and
receiving the raised area of the interior surface within the pocket.

18. The method of claim 17, wherein the stator bobbin includes a first member and a second member, the first member being metallic and the second member being more electrically insulative than the first member, the second member covering the first member to cooperatively define the stator bobbin with the first member.

* * * * *